United States Patent
Ozawa et al.

(10) Patent No.: US 9,624,327 B2
(45) Date of Patent: Apr. 18, 2017

(54) METHOD FOR MANUFACTURING (METH)ACRYLIC RESIN COMPOSITION

(71) Applicant: KURARAY CO., LTD., Kurashiki-shi (JP)

(72) Inventors: Hiroshi Ozawa, Tainai (JP); Yasuhito Kitade, Tainai (JP); Shouji Tanaka, Tainai (JP)

(73) Assignee: KURARAY Co., Ltd., Kurashiki-shi (JP)

( * ) Notice: Subject to any disclaimer, the term of this patent is extended or adjusted under 35 U.S.C. 154(b) by 0 days.

(21) Appl. No.: 15/108,455

(22) PCT Filed: Dec. 26, 2014

(86) PCT No.: PCT/JP2014/084496
§ 371 (c)(1),
(2) Date: Jun. 27, 2016

(87) PCT Pub. No.: WO2015/099118
PCT Pub. Date: Jul. 2, 2015

(65) Prior Publication Data
US 2016/0326287 A1 Nov. 10, 2016

(30) Foreign Application Priority Data
Dec. 27, 2013 (JP) .................................. 2013-273187

(51) Int. Cl.
*C08F 220/14* (2006.01)
*C08F 20/14* (2006.01)
(Continued)

(52) U.S. Cl.
CPC .......... *C08F 220/14* (2013.01); *C08F 120/14* (2013.01); *C08F 2400/02* (2013.01)

(58) Field of Classification Search
CPC .......... C08F 2/02; C08F 20/14; C08F 220/14; C08F 2400/02
(Continued)

(56) References Cited

U.S. PATENT DOCUMENTS 4,837,286 A 6/1989 Kato et al.
4,885,125 A 12/1989 Kato et al.
(Continued)

FOREIGN PATENT DOCUMENTS

JP 6-312122 11/1994
JP 2752458 2/1998
(Continued)

OTHER PUBLICATIONS

Machine translation of JP 2752458B2; publication date: May 18, 1998.*
(Continued)

*Primary Examiner* — Fred M Teskin
(74) *Attorney, Agent, or Firm* — Oblon, McClelland, Maier & Neustadt, L.L.P.

(57) ABSTRACT

A method for producing a (meth)acrylic resin composition, the method comprises the steps of continuously feeding methyl methacrylate and the other materials into a tank reactor while controlling each of the amounts thereof, performing bulk polymerization in the tank reactor to obtain a reaction product, recovering a mixture (A) containing methyl methacrylate and the others from the reaction product, and continuously feeding the mixture (A) into the tank reactor, wherein each of the amounts of methyl methacrylate and the others being fed into the tank reactor are controlled on the basis of the amount of the mixture (A) being fed into the tank reactor and the proportions of methyl methacrylate and the others in the mixture (A), and the perfect-mixing time of the tank reactor, the half life of a radical polymer- (Continued)

ization initiator at a temperature equal to the temperature inside the tank reactor, the agitation power of the tank reactor, the mean residence time of a reaction starting material in the tank reactor, and the concentration of the radical polymerization initiator in the reaction starting material satisfy a particular relationship.

8 Claims, 1 Drawing Sheet

(51) Int. Cl.
    *C08F 2/02*     (2006.01)
    *C08F 120/14*     (2006.01)
    *B01J 19/18*     (2006.01)

(58) Field of Classification Search
    USPC .......................................................... 526/68
    See application file for complete search history.

(56) References Cited

U.S. PATENT DOCUMENTS 5,728,793 A * 3/1998 Kumagai ................ C08F 20/14
                                                     526/224
2006/0089474 A1     4/2006   Yamazaki et al.

FOREIGN PATENT DOCUMENTS

JP           2752458 B2 *   5/1998  ............... C08F 2/02
JP           2009-256493     11/2009

OTHER PUBLICATIONS

International Search Report mailed Jan. 27, 2015 in application No. PCT/JP2014/084496.

* cited by examiner

METHOD FOR MANUFACTURING (METH)ACRYLIC RESIN COMPOSITION

TECHNICAL FIELD

The present invention relates to a method for producing a (meth)acrylic resin composition. More specifically, the present invention relates to a method for producing a (meth)acrylic resin composition that is excellent, in thermal stability and formability and can efficiently give a formed article having little discoloration.

BACKGROUND ART

Articles formed of (meth)acrylic resin compositions have excellent transparency and low optical distortion, and therefore find wide application as an optical component such as lenses, prisms, retardation films, light guide plates, light diffuser films, protective films for polarizer plates and the like.

As a method for producing a (meth)acrylic resin composition, Patent Document 1, for example, discloses a method comprising subjecting a monomer mixture predominantly comprising methyl methacrylate to continuous bulk polymerization in a single complete mixing-type tank reactor using no solvent, in which the polymerization is carried out after the content of oxygen dissolved in the monomer mixture is regulated to not more than 1 ppm by inert gas introduction, with the use of a radical initiator having a half life of 0.5 to 120 seconds at the polymerization temperature, while stirring with a stirrer having agitation power consumption of 0.5 to 20 kW per 1 m³ of the reaction mixture, with the mean residence time being set in away that the ratio of the half life of the radical initiator to the mean residence time at the polymerization temperature is ½₀₀ to ¹⁄₁₀₀₀₀, and at conversion from a monomer of 45 to 70% at 130 to 160° C.

Patent Document 2 discloses a continuous polymerization apparatus and a method of continuous polymerization using the continuous polymerization apparatus, for continuous and steady production of an acrylic resin composition, the apparatus having a means for controlling the feeding amounts of a starting monomer and/or a polymerization initiator so that the temperature within a reaction tank is maintained to be equal to the temperature of a temperature regulator that regulates the temperature of the interior wall surface of the reaction tank.

CITATION LIST

Patent Literatures

Patent Document 1: JP 2752458 B
Patent Document 2: JP 4323406 B

Non-Patent Literatures

Non-Patent Document 1: "Organic peroxides, hydrogen abstraction ability and efficiency as initiator" Technical Data from Nippon Oil E., Fats Co., Ltd., April, 2003
Non-Patent Document 2: "Kagaku Kogaku Binran", Kagaku Kogaku Kyokai, 3rd revision, p1068 (1968)

SUMMARY OF THE INVENTION

Problems to be Solved by the Invention

In the method described in Patent Document 1, the radical polymerization reaction initiates and proceeds right after the starting raw materials are fed into the reaction tank. If the monomer proportion in the monomer mixture fluctuates during continuous feeding, the structure unit proportion in the resulting polymer can also fluctuate, potentially leading to impaired transparency. In the method disclosed by Patent Document 2, the residence time within a heater or the like placed downstream of the reaction tank fluctuates depending on how the feeding of the monomer is being controlled. Therefore, the amounts of dimers and trimers produced tend to fluctuate, and the properties to be obtained such as heat resistance and formability fluctuate.

An object of the present invention is to provide a method for producing a (meth)acrylic resin composition that is excellent, in thermal stability and formability and can efficiently give a formed article having excellent transparency.

Means for Solving the Problems

As a means for achieving the object, the present invention includes the following embodiments.

[1] A method for producing a (meth)acrylic resin composition, the method comprising the steps of: continuously feeding methyl methacrylate (1), a chain transfer agent (3), and a radical polymerization initiator (4) into a tank reactor while controlling each amount of the methyl methacrylate (1), the chain transfer agent (3), and the radical polymerization initiator (4), performing bulk polymerization in the tank reactor at a polymerization conversion of 40 to 70% by mass to obtain a reaction product, recovering a mixture (A) containing methyl methacrylate (1') and a chain transfer agent (3') from the reaction product, and continuously feeding the mixture (A) into the tank reactor, wherein each of the amounts of the methyl methacrylate (1) and the chain transfer agent (3) being fed into the tank reactor is controlled on the basis of information comprising an amount of the mixture (A) being fed into the tank reactor and proportions of the methyl methacrylate (1') and the chain transfer agent (3') in the mixture (A), and a perfect-mixing time of the tank reactor ($\theta_M$ [hr]), a half life of the radical polymerization initiator at a temperature equal to a temperature inside the tank reactor ($\tau_{1/2}$ [hr]), a agitation power of the tank reactor ($P_V$ [kW/m³]), a mean residence time of a reaction starting material in the tank reactor ($\theta$ [hr]), and a concentration of the radical polymerization initiator in the reaction starting material (I [ppm]) satisfy:

$$\theta_M > \tau_{1/2}, \text{ and}$$

$$P_V \times \theta \times I \times \tau_{1/2} < 4$$

[2] The method for producing a (meth)acrylic resin composition as described in [1], wherein each of the amounts of the mixture (A), the methyl methacrylate (1), the chain transfer agent (3), and the radical polymerization initiator (4) being fed into the tank reactor is measured with a mass flowmeter, and each of the amounts of the chain transfer agent (3) and the radical polymerization initiator (4) being fed into the tank reactor is controlled with a reciprocating pump.

[3] The method for producing a (meth)acrylic resin composition as described in [1], further comprising: a step of continuously feeding an acrylic acid alkyl ester (2) into the tank reactor while controlling an amount of the acrylic acid alkyl ester (2), wherein
the mixture (A) recovered from the reaction product further contains an acrylic acid ester (2'), and the amount of the acrylic acid alkyl ester (2) being fed is controlled on the basis of information comprising the amount of the mixture (A) being fed into the tank reactor and a proportion of the acrylic acid ester (2') in the mixture (A).

[4] The method for producing a (meth)acrylic resin composition as described in [3], wherein
each of the amounts of the mixture (A), the methyl methacrylate (1), the acrylic acid alkyl ester (2), the chain transfer agent (3), and the radical polymerization initiator (4) being fed into the tank reactor is measured with a mass flowmeter, and each of the amounts of the acrylic acid alkyl ester (2), the chain transfer agent (3), and the radical polymerization initiator (4) being fed into the tank reactor is controlled with a reciprocating pump.

[5] The method for producing a (meth)acrylic resin composition as described in any one of [1] to [4], wherein
the temperature inside the tank reactor is 110 to 160° C., and the half life of the radical polymerization initiator (4) at the temperature equal to the temperature inside the tank reactor is 0.5 to 120 seconds.

Advantageous Effects of the Invention

According to the method of the present invention, a (meth)acrylic resin composition having excellent transparency, having low contents of dimers and trimers, having a low level of loss on heating, giving an injection-molded article with few silver streaks, and having excellent thermal stability can be steadily obtained.

EMBODIMENTS FOR CARRYING OUT THE INVENTION

Figure 1:
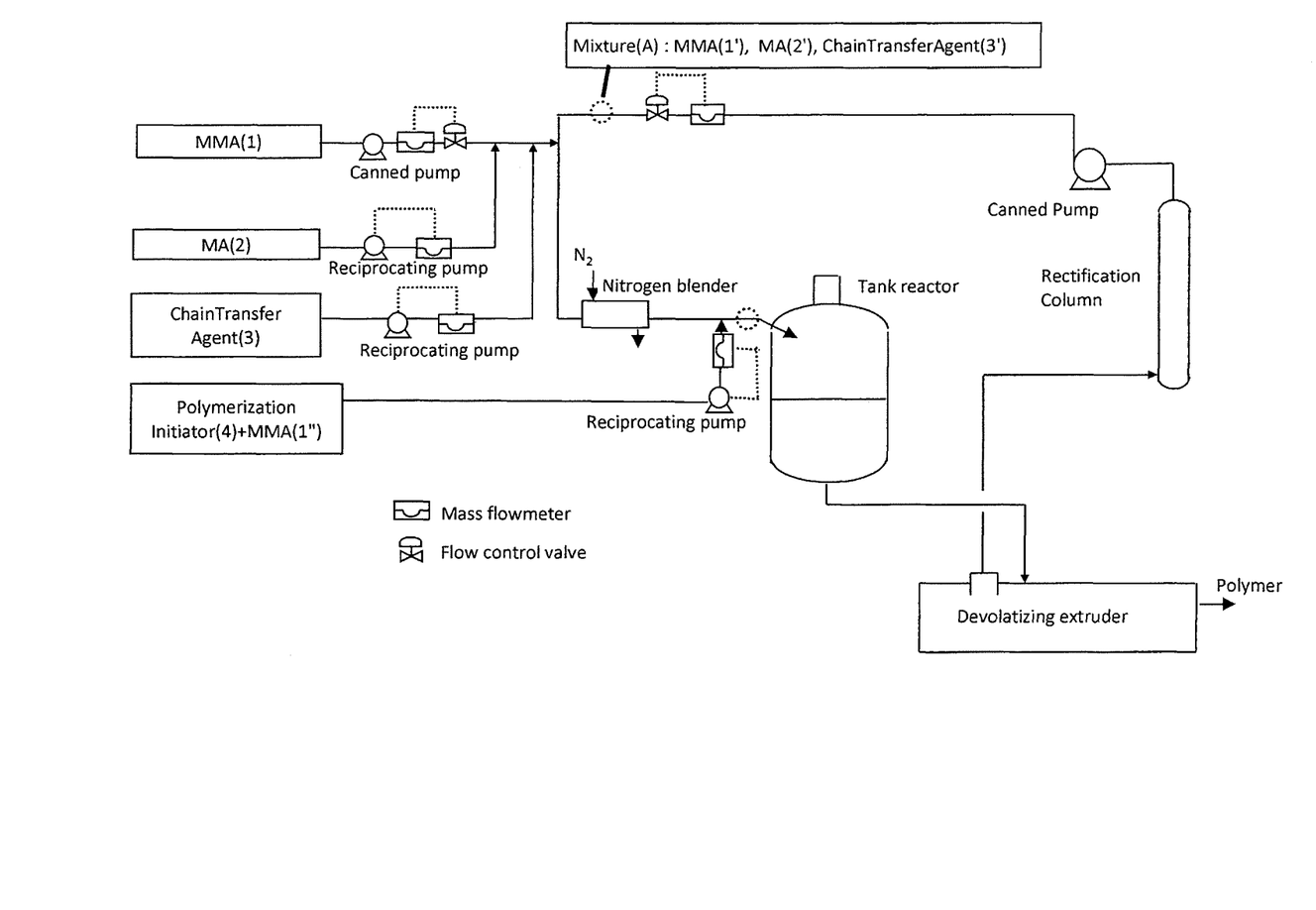
The figure illustrates an apparatus used to implement the method according to the present invention.

A method for producing a (meth)acrylic resin composition according to one embodiment of the present invention comprises a step of continuously feeding methyl methacrylate (1), a chain transfer agent (3), a radical polymerization initiator (4), and an acrylic acid alkyl ester (2) as an optional component into a tank reactor while controlling each of the amounts of the methyl methacrylate (1), the chain transfer agent (3), the radical polymerization initiator (4), and optionally the acrylic acid alkyl ester (2), a step of performing bulk polymerization in the tank reactor at a polymerization conversion of 40 to 70% by mass to obtain a reaction product, a step of recovering a mixture (A) containing methyl methacrylate (1'), a chain transfer agent (3'), and an acrylic acid alkyl ester (2') as an optional component from the reaction product, and a step of continuously feeding the mixture (A) into the tank reactor.

A reaction starting material used in the present invention comprises the methyl methacrylate (1), the chain transfer agent (3), the radical polymerization initiator (4), the mixture (A) recovered from the reaction product described below, the acrylic acid alkyl ester (2) as an optional component, and an additional monomer (5).

The methyl methacrylate contained in the reaction starting material is composed of the virgin methyl methacrylate (1) not yet undergone a polymerization reaction, the methyl methacrylate (1') contained in the mixture (A) recovered from the reaction product, and methyl methacrylate (1'') contained in a solution of the polymerization initiator (4) in methyl methacrylate described below.

The amount of the methyl methacrylate (1) being fed is preferably measured with a mass flowmeter. The amount of the methyl methacrylate (1) being fed can be regulated with a pump or a valve, for example. As a pump for feeding the methyl methacrylate (1), a pump having a large feeding capacity is used. Examples thereof include a centrifugal pump such as a canned pump, or the like.

The sum of the amounts of the methyl methacrylate (1), the methyl methacrylate (1') and the methyl methacrylate (1'') being fed is preferably 80 to 100 parts by mass, more preferably 80 to 99.9 parts by mass, and further preferably 80 to 96 parts by mass in 100 parts by mass of all the polymerizable monomers subjected to polymerization. To achieve it, the amount of the methyl methacrylate (1) being fed is determined on the basis of information comprising the amount of the mixture (A) being fed, the proportion of the methyl methacrylate (1') in the mixture (A), the amount of the solution of the polymerization initiator being fed, and the proportion of the methyl methacrylate (1'') in the solution of the polymerization initiator. According to the value thus determined, the degree of opening of the valve and the discharge rate from the pump are regulated.

The acrylic acid alkyl esters that may be contained in the reaction starting material are composed of the virgin acrylic acid alkyl ester (2) not yet undergone a polymerization reaction and the acrylic acid alkyl ester (2') contained in the mixture (A) recovered from the reaction product.

The amount of the acrylic acid alkyl ester (2) being fed is preferably measured with a mass flowmeter. The amount of the acrylic acid alkyl (2) being fed can be regulated with a pump or a valve, for example. As a pump for feeding the acrylic acid alkyl ester (2), a positive displacement pump is preferably used.

The sum of the amounts of the acrylic acid alkyl ester (2) and the acrylic acid alkyl ester (2') being fed is preferably 0 to 20 parts by mass, more preferably 0.1 to 20 parts by mass, and further preferably 4 to 20 parts by mass in 100 parts by mass of all the polymerizable monomers subjected to polymerization. To achieve it, the amount of the acrylic acid alkyl ester (2) being fed is determined on the basis of information comprising the amount of the mixture (A) being fed and the proportion of the acrylic acid alkyl ester (2') in the mixture (A). According to the value thus determined, the degree of opening of the valve and the discharge rate from the pump are regulated.

Examples of the acrylic acid alkyl ester (2) or (2') include methyl acrylate, ethyl acrylate, propyl acrylate, butyl acrylate, 2-ethylhexyl acrylate, and the like. Among these, methyl acrylate is preferable.

The reaction starting material used in the present invention may contain a monomer other than methyl methacrylate or an acrylic acid alkyl ester. Examples of such an additional monomer include vinyl monomers having a single polymerizable alkenyl group per molecule, for example, methacrylic acid alkyl esters except for methyl methacrylate, such as ethyl methacrylate, butyl methacrylate and the like; aryl methacrylate esters such as phenyl methacrylate and the like; cycloalkyl methacrylate esters such as cyclohexyl methacrylate, norbornenyl methacrylate and the like; aryl acrylate esters such as phenyl acrylate and the like; cycloalkyl acrylate esters such as cyclohexyl acrylate, norbornenyl acrylate and the like; aromatic vinyl monomers such as styrene, α-methylstyrene and the like; acrylamide; methacrylamide; acrylonitrile; methacrylonitrile; and the like.

The additional monomer that may be contained in the reaction starting material is composed of the virgin monomer (5) not yet undergone a polymerization reaction and a monomer (5') contained in the mixture (A) recovered from the reaction product.

The amount of the monomer (5) being fed is preferably measured with a mass flowmeter. The amount of the monomer (5) being fed can be regulated with a pump or a valve. As a pump for feeding the monomer (5), a positive displacement pump is preferably used.

The sum of the amounts of the monomer (5) and the monomer (5') being fed is preferably not more than 10 parts by mass and more preferably not more than 5 parts by mass in 100 parts by mass of all the polymerizable monomers subjected to polymerization. To achieve it, the amount of the monomer (5) being fed is determined on the basis of information comprising the amount of the mixture (A) being fed and the proportion of the monomer (5') in the mixture (A). According to the value thus determined, the degree of opening of the valve and the discharge rate from the pump are regulated.

Each of the methyl methacrylate (1), the acrylic acid alkyl ester (2), and the additional monomer (5) has a b* value of preferably −1 to 2 and more preferably −0.5 to 1.5. The b* value within this range is advantageous because the resulting (meth)acrylic resin composition efficiently gives a formed article having little discoloration. The b* value is a value measured in accordance with the standard defined by the International Commission on Illumination (CIE) (1976) or JIS Z-8722.

The chain transfer agent contained in the reaction starting material is composed of the virgin chain transfer agent (3) not yet undergone a polymerization reaction and the chain transfer agent (3') contained in the mixture (A) recovered from the reaction product.

The amount of the chain transfer agent (3) being fed is preferably measured with a mass flowmeter. The amount of the chain transfer agent (3) being fed can be regulated with a pump or a valve. As a pump for feeding the chain transfer agent (3), a positive displacement pump is preferably used.

The sum of the amounts of the chain transfer agent (3) and the chain transfer agent (3') being fed is determined so that a (meth)acrylic resin produced by a polymerization reaction has a desirable molecular weight and a desirable molecular weight distribution. In general, the sum of the amounts of the chain transfer agent (3) and the chain transfer agent (3') being fed is preferably 0.1 to 1 part by mass, more preferably 0.2 to 0.8 part by mass, and further preferably 0.3 to 0.6 part by mass relative to 100 parts by mass of all the polymerizable monomers subjected to polymerization. To achieve it, the amount of the chain transfer agent (3) being fed is determined on the basis of information comprising the amount of the mixture (A) being fed and the proportion of the chain transfer agent (3') in the mixture (A). According to the value thus determined, the degree of opening of the valve and the discharge rate from the pump are regulated.

Examples of the chain transfer agent used in the present invention include alkylmercaptans such as n-octyl mercaptan, n-dodecyl mercaptan, t-dodecyl mercaptan, 1,4-butanedithiol, 1,6-hexanedithiol, ethylene glycol bisthiopropionate, butanediol bisthioglycolate, butanediol bisthiopropionate, hexanediol bisthioglycolate, hexanediol bisthiopropionate, trimethylolpropane tris-(β-thiopropionate), pentaerythritol tetrakisthiopropionate and the like; an α-methylstyrene dimer; terpinolene; and the like. Among these, monofunctional alkylmercaptans such as n-octyl mercaptan and n-dodecyl mercaptan are preferable. The chain transfer agent can be used alone or as a combination of two or more of these.

Each of the methyl methacrylate (1), the acrylic acid alkyl ester (2), the additional monomer (5), and the chain transfer agent (3) used in the present invention has a dissolved oxygen content of preferably not more than 10 ppm, more preferably not more than 5 ppm, further preferably not more than 4 ppm, and most preferably not more than 3 ppm. When the dissolved oxygen content is within this range, a polymerization reaction proceeds smoothly and it tends to be easy to obtain a formed article free of silver streak or discoloration. The dissolved oxygen content can be regulated by nitrogen purge, for example.

The radical polymerization initiator contained in the reaction starting material is composed of the virgin radical polymerization initiator (4) not yet undergone a polymerization reaction. When the radical polymerization initiator used has a very long half life, the mixture (A) recovered from the reaction product may contain a radical polymerization initiator (4'). But, it is ordinary and preferable that the radical polymerization initiator (4) being fed is completely exhausted within the tank reactor, from the viewpoint of allowing a polymerization reaction to proceed more steadily.

The amount of the radical polymerization initiator (4) being fed is preferably measured with a mass flowmeter. The amount of the radical polymerization initiator (4) being fed can be regulated with a pump or a valve. As a pump for feeding the radical polymerization initiator (4), a positive displacement pump is preferably used. The amount of the radical polymerization initiator (4) being fed is preferably 0.0001 to 0.02 part by mass and more preferably 0.001 to 0.01 part by mass relative to 100 parts by mass of all the polymerizable monomers subjected to polymerization. The radical polymerization initiator used in the present invention, when in a solid state, is preferably dissolved in a liquid medium before being fed into the tank reactor. The liquid medium used is preferably a liquid monomer such as methyl methacrylate. As described above, the amount of the solution of the radical polymerization initiator (4) in methyl methacrylate and the proportion of the methyl methacrylate (1") in the solution of the radical polymerization initiator (4) in methyl methacrylate are used as basic data for determining the amount of the methyl methacrylate (1) being fed.

The radical polymerization initiator used in the present invention has a half life of preferably 0.5 to 120 seconds and more preferably 2 to 60 seconds at a temperature equal to the temperature inside the tank reactor, that is, the temperature of the liquid in the tank reactor. The radical polymerization initiator used in the present invention has a hydrogen abstraction capacity of preferably not more than 40% and more preferably not more than 30%.

As the radical polymerization initiator used in the present invention, t-hexylperoxy isopropyl monocarbonate, t-hexylperoxy 2-ethylhexanoate, 1,1,3,3-tetramethylbutylperoxy 2-ethylhexanoate, t-butylperoxy pivalate, t-hexylperoxy pivalate, t-butylperoxy neodecanoate, t-hexylperoxy neodecanoate, 1,1,3,3-tetramethylbutylperoxy neodecanoate, 1,1-bis(t-hexylperoxy)cyclohexane, benzoyl peroxide, 3,5,5-trimethylhexanoyl peroxide, lauroyl peroxide, 2,2'-azobis(2-methylpropionitrile), 2,2'-azobis(2-methylbutyronitrile), and dimethyl 2,2'-azobis(2-methylpropionate) are preferable, for example, and mentioned are t-hexylperoxy 2-ethylhexanoate, 1,1-bis(t-hexylperoxy)cyclohexane, dimethyl 2,2'-azobis(2-methylpropionate), and the like. The radical polymerization initiator can be used alone or as a combination of two or more of these.

The hydrogen abstraction capacity can be found, for example, in the Technical data from the manufacturer of the polymerization initiator (for example, "Organic peroxides, hydrogen abstraction ability and efficiency as initiator" Technical Data from Nippon Oil & Fats Co., Ltd., April, 2003), or can be determined by the radical trapping method using an α-methylstyrene dimer, in other words, by the α-methylstyrene dimer trapping method. The determination is generally carried out as follows. First, in the co-presence of an α-methylstyrene dimer serving as a radical-trapping agent, the polymerization initiator is cleaved into radical fragments. Among the resulting radical fragments, a radical fragment having a low hydrogen abstraction capacity adds to and is trapped by a double bond of an α-methylstyrene dimer, while a radical fragment having a high hydrogen abstraction capacity abstracts hydrogen from cyclohexane to generate a cyclohexyl radical, which adds to and is trapped by a double bond of an α-methylstyrene dimer to generate a cyclohexane-trapped product. Then, the cyclohexane or the cyclohexane-trapped product is quantitatively assessed, and the resulting value is used to determine the ratio (molar fraction) of the amount of radical fragments having a high hydrogen abstraction capacity to the theoretical amount of radical fragments generated. The resulting ratio serves as the hydrogen abstraction capacity.

Examples of suitable positive displacement pumps for feeding the acrylic acid alkyl ester, the chain transfer agent, and the radical polymerization initiator include a rotary pump, a reciprocating pump, and the like. A positive displacement pump has excellent quantification ability. Examples of the reciprocating pump include a diaphragm pump, a piston pump, an axial piston pump, a plunger pump, a rotary plunger pump, a uniflow pump, a Worthington pump, and the like. Examples of the rotary pump include a gear pump, a screw pump, a vane pump, and the like. A reciprocating pump generates pulsation, which can be reduced by using a duplex reciprocating pump. Among these, a reciprocating pump is preferable and a plunger pump is more preferable in the present invention.

The mixture (A) contained in the reaction starting material is obtained by recovery from the reaction product. The amount of the mixture (A) recovered from the reaction product and being fed into the tank reactor is preferably measured with a mass flowmeter. The amount of the mixture (A) recovered from the reaction product and being fed can be regulated with a pump and a valve. As a pump for feeding the mixture (A) recovered from the reaction product., a pump having a large feeding capacity is used. Examples thereof include a centrifugal pump such as a canned pump, and the like.

The b* value of the mixture (A) may increase due to heat applied during recovery or the like. In such cases, purification can be performed by a suitable method so as to obtain a b* value of preferably −1 to 2 and more preferably −0.5 to 1.5. The b* value within this range is advantageous because the resulting (meth)acrylic resin composition efficiently gives a formed article having little discoloration. The b* value is a value measured in accordance with the standard defined by the International Commission on Illumination (CIE) (1976) or JIS Z-8722.

Although no solvent is generally used in bulk polymerization, when it is necessary to modulate the viscosity of the reaction mixture, for example, a solvent can be contained in the reaction starting material. As the solvent, an aromatic hydrocarbon such as benzene, toluene, ethylbenzene or the like is preferable. The solvent can be used alone or as a combination of two or more of these. The amount of the solvent is preferably not more than 30 parts by mass and more preferably not more than 10 parts by mass relative to 100 parts by mass of all the polymerizable monomers subjected to polymerization.

Usually, the mass flowmeter used for measuring each flow rate of the mixture (A), the methyl methacrylate (1), the acrylic acid alkyl ester), the chain transfer agent (3), and the radical polymerization initiator (4) being fed into the tank reactor can output measurement data continuously or discretely.

The proportion of the methyl methacrylate (1'), the acrylic acid alkyl ester (2'), and the chain transfer agent (3') in the mixture (A) being fed into the tank reactor can be measured using an analyzer or the like. Measurement using the analyzer or the like may be performed continuously, or may be performed discretely, for example, every 8 hours or 3 times a day. As the analyzer, a gas chromatography is preferably used.

The continuous data or the discrete data thus obtained can be subjected to calculation according to a predetermined control algorithm, and the calculation results can be used to regulate the degree of opening of the valve, the discharge rate from the pump, and the like.

In the present invention, each of the amounts of the methyl methacrylate (1), the acrylic acid alkyl ester (2), and the chain transfer agent (3) being fed into the tank reactor is controlled on the basis of information comprising the amount of the mixture (A) being fed into the tank reactor and each of the proportions of the methyl methacrylate (1'), the acrylic acid alkyl ester (2') and the chain transfer agent (3') in the mixture (A). The control of these amounts is performed so that the respective total amounts of the methyl methacrylate, the acrylic acid alkyl ester, and the chain transfer agent being fed into the tank reactor are equal to the desired respective amounts thereof in part by mass described above.

Specific procedure is as follows, for example.

When the target total amount of the methyl methacrylate being fed into the tank reactor is set as $M_{Tmma}$ [kg/hr], the amount of the methyl methacrylate (1) being fed, expressed as $M_{vmma}$ [kg/hr], is determined by a math formula: $M_{Tmma} - 0.01 X_{Imma} \times M_{vinit} - 0.01 X_{mma} \times M_c$, in which $X_{mma}$ [%, by mass] is the proportion of the methyl methacrylate (1') in the mixture (A), $M_{vinit}$ [kg/hr] is the amount of the mixture (A) being fed, $M_{vinit}$ [kg/hr] is the amount of the solution of the radical polymerization initiator (4) in methyl methacrylate being fed into the tank reactor and $X_{Imma}$ [% by mass] is the proportion of the methyl methacrylate (1") in the solution of the radical polymerization initiator (4) in methyl methacrylate. So as to obtain the $M_{vmma}$ value [kg/hr] thus determined, feedback control or the like is performed by using a combination of flowmeters with valves and pumps.

When the target total amount of the acrylic acid alkyl esters being fed into the tank reactor is set as $M_{Tma}$ [kg/hr], the amount of the acrylic acid alkyl ester (2) being fed, expressed as $M_{vma}$ [kg/hr], is determined by a math formula: $M_{Tma} - 0.01 X_{ma} \times M_c$, in which $X_{ma}$ [% by mass] is the proportion of the acrylic acid alkyl ester (2') in the mixture (A) and $M_c$ [kg/hr] is the amount of the mixture (A) being fed. So as to obtain the $M_{vma}$ value [kg/hr] thus determined, feedback control or the like is performed by using a combination of flowmeters with valves and pumps. The amount of the additional polymer (5) being fed is also determined in the same manner as above, and so as to obtain the value thus determined, feedback control or the like is performed in the same manner as above.

When the target total amount of the chain transfer agent being fed into the tank reactor is set as $M_{Ttran}$ [kg/hr], the amount of the chain transfer agent (3) being fed, expressed as $M_{vtran}$ [kg/hr], is determined by a math formula: $M_{Ttran}$–0.01$X_{tran} \times M_c$, in which $X_{tran}$ [% by mass] is the proportion of the chain transfer agent (3') in the mixture (A) and $M_c$ [kg/hr] is the amount of the mixture (A) being fed. So as to obtain the $M_{vtran}$ value [kg/hr] thus determined, feedback control or the like is performed by using a combination of flowmeters with valves and pumps.

When the target total amount of the radical polymerization initiator being fed into the tank reactor is set as $M_{Tinit}$ [kg/hr], the amount of the solution of the radical polymerization initiator (4) in methyl methacrylate being fed, expressed as $M_{vinit}$ [kg/hr], is determined by a math formula: $M_{Tinit}/0.01X_{Tinit}$, in which $X_{Tinit}$ [% by mass] is the proportion of the radical polymerization initiator (4) in the solution of the radical polymerization initiator (4) in methyl methacrylate. So as to obtain the $M_{vinit}$ value [kg/hr] thus determined, feedback control or the like is performed by using a combination of flowmeters with valves and Dumps.

The values $M_{Tmma}$ [kg/hr], $M_{Tma}$ [kg/hr]; $M_{Ttran}$ [kg/hr], and $M_{Tinit}$ [kg/hr] are determined on the basis of, for example, the amount of the methacrylic resin to be produced, F [kg/hr], the ratios between constituent monomer units of the methacrylic resin, and the molecular weight, the molecular weight distribution, and the polymerization conversion, X, [% by mass] of the methacrylic resin.

The tank reactor used in the method of the present invention usually has a stirring means for stirring the liquid in the tank reactor, an inlet through which the reaction starting material is fed into the Lank reactor, and an outlet through which the reaction product is discharged from the tank reactor. In the present invention, the amount of the reaction starting material being fed into the tank reactor is balanced with the amount of the reaction product discharged from the tank reactor so that the amount of the liquid in the tank reactor remains approximately constant. The amount of the liquid in the tank reactor is preferably not less than ¼, more preferably ¼ to ¾, and further preferably ⅓ to ⅔ the capacity of the tank reactor.

In the tank reactor used in the present invention, the inlet through which the reaction starting material is fed into the tank reactor may be provided in the top surface of the tank reactor, or may be provided in the side surface of the tank reactor, or may be provided in the bottom surface of the tank reactor. The inlet may be provided at a height higher than the liquid level in the tank reactor or may be provided at a height lower than the liquid level in the tank reactor. The inlet may have the shape of the actual cut end of a round tube, or may have such a shape that the reaction starting material is widely sprinkled onto the liquid surface in the tank reactor.

Examples of the stirring means include a Maxblend stirring device, a lattice-blade-type stirring device, a propeller-driven stirring device, a screw stirring device, a helical-ribbon-type stirring device, a paddle-type stirring device, and the like. Among these, a Maxblend stirring device is preferable in terms of homogeneous mixing.

The temperature inside the tank reactor, namely, the temperature of the liquid in the tank reactor is preferably 100 to 170° C., more preferably 110 to 160° C., and further preferably 115 to 150° C. The liquid temperature can be controlled, for example, by external heat exchange using a jacket, a heat exchanger tube, or the like, or by self heat exchange in which a tube is provided within the tank reactor so that the reaction starting material or the reaction product flows through the tube.

It is preferable that the mixture (A), the methyl methacrylate (1), the acrylic acid alkyl ester (2), the chain transfer agent (3), and the radical polymerization initiator (4) have been mixed by the time immediately before they reach the inlet of the tank reactor. The reaction starting material except for the radical polymerization initiator is preferably handled in an inert atmosphere such as in nitrogen gas or the like. In order to allow the continuous-flow operation to proceed smoothly, it is preferable to continuously feed each component of the reaction starting material respectively from the tank storing the component through a tube to a mixer located upstream of the tank reactor, while mixing, and then feed the resulting mixture continuously to the tank reactor. The mixer can be equipped with a dynamic stirrer or a static stirrer.

In the method of the present invention, the numerical value of the perfect-mixing time of the tank reactor ($\theta_M$ [hr]) is higher than the numerical value of the half life of the radical polymerization initiator at the temperature equal to the temperature inside the tank reactor ($\tau_{1/2}$ [hr]), and is preferably higher than the numerical value of 1.2 times the half life. In other words, the relationship $\theta_M > \tau_{1/2}$ is satisfied, and preferably the relationship $\theta_M > 1.2 \times \tau_{1/2}$ is satisfied. The perfect-mixing time is an indicator of the mixing properties of the tank reactor, and is determined by "n·$\theta_M$–Re curve", which represents the relationship between n·$\theta_M$ (non-dimensional mixed number [n refers to the rotational speed of blades [1/sec]]) and Re (the Reynolds number: an indicator representing the disordered state of the liquid) The perfect-mixing time and the n·$\theta_M$–Re curve are described in Non-patent Document 2, JP S61-200842 A, or JP H06-312122 A, for example.

The agitation power of the tank reactor ($P_v$) is preferably 0.2 to 7 kW/m$^3$, more preferably 0.3 to 6 kW/m$^3$, and further preferably 0.4 to 5 W/m$^3$. The agitation power can be regulated by selecting the shape and the rotational speed of the stirring blades and the viscosity and the density of the liquid in the tank reactor.

The mean residence time of the reaction starting material in the tank reactor, ($\theta$), is preferably 0.5 to 6 hours, more preferably 1 to 5 hours, and further preferably 2 to 4 hours. When the mean residence time is too short, the amount of the polymerization initiator required is great. When the amount of the polymerization initiator required is great, the polymerization reaction tends to be difficult to control and the molecular weight tends to be difficult to control. On the other hand, when the mean residence time is too long, it tends to take long until the reaction reaches a steady state and productivity tends to be low. The mean residence time can be regulated by selecting the capacity of the tank reactor and the amount of the reaction starting material being fed.

Furthermore, the agitation power of the tank reactor ($P_V$ [kW/m$^3$]) and the mean residence time within the tank reactor (0 [hr]) are determined so that they satisfy the relationship $P_V \times \theta \times I \times \tau_{1/2} < 4$, preferably $P_V \times \theta \times I \times \tau_{1/2} < 3$, and more preferably $P_V \times \theta \times I \times \tau_{1/2} < 2$, with the concentration of the radical polymerization initiator in the reaction starting material (I [ppm]) and the half life of the radical polymerization initiator at the temperature equal to the temperature inside the tank reactor ($\tau_{1/2}$ [hr]). The bulk polymerization is preferably performed in an inert gas atmosphere such as in nitrogen gas or the like.

The relationship described above is explained using the following examples.

First example: When operation is carried out with constant θ, using a certain initiator, and at an increased rotational speed of stirring and at an increased $P_V$ value, the concentration of the initiator can be decreased within the range defined by the relationship.

Second example: When operation is carried out with constant θ, at a constant concentration of the initiator, and at a decreased rotational speed of stirring, the $\tau_{1/2}$ value of the radical polymerization initiator used can be increased within the range defined by the relationship.

When operation is carried out without satisfying the relationship, the following problems tend to occur.

Third example: When the $P_V$ value is high, running costs are high.

Fourth example: When the θ value is high, a large apparatus is required and initial costs are high.

Fifth example: When the I value is high, the resulting (meth)acrylic resin composition has poor thermal stability.

Sixth example: When the $\tau_{1/2}$ value is high, polymerization inside the tank reactor proceeds even when feeding of the reaction starting material into the tank reactor is shut down in emergency, and thus a reaction is difficult to control.

The bulk polymerization within the tank reactor is preferably performed until the polymerization conversion reaches 40 to 70% by mass and preferably 35 to 65% by mass.

In the method for producing a (meth)acrylic resin composition of the present invention, the water content of the reaction mixture in the tank reactor is preferably not more than 1000 ppm, more preferably not more than 700 ppm, and further preferably not more than 280 ppm. When the water content is not more than 1000 ppm, a resin contaminant of several micrometers to several dozen micrometers can be inhibited from occurring during a polymerization reaction, and consequently when the resulting (meth)acrylic resin composition is subjected to melt formation, the resulting film or sheet can have a significantly reduced number of blemishes attributable to the resin contaminant serving as a nucleus and having an outer diameter of several dozen micrometers.

Although the mechanism that the occurring of the resin contaminant is thus inhibited is not clear, it is presumed that a (meth)acrylic resin having a high molecular weight may be formed in the gas phase within the tank reactor during polymerization of the monomer mixture (A), get mixed as a resin contaminant, remain unmelted during melt formation, and act as a nucleus to form a blemish.

Examples of the method for reducing the water content of the reaction mixture include, for example, a method comprising treating the liquid starting material in advance using an adsorption/dehydration column or the like, a method comprising introducing an inert gas into the gas phase within the tank reactor so that some vapor is entrained in the inert gas, condensed in a condenser of a brine cooler, and discharged out of the system.

Downstream of the tank reactor, another reactor may be provided. The reactor that may be provided downstream may be a tank reactor or a tube reactor. The downstream reactor can allow the bulk polymerization to further proceed and can give an even higher polymerization conversion.

The reaction product thus obtained by the bulk polymerization is discharged from the tank reactor (or from another reactor provided downstream, if any). The amount of the reaction product being discharged is preferably balanced with the amount of the reaction starting material being fed so that the amount of the liquid contained in the tank reactor remains constant.

The reaction product contains the (meth)acrylic resin, the methyl methacrylate (1'), the acrylic acid alkyl ester (2'), and the chain transfer agent (3').

The content of the (meth)acrylic resin in the reaction product is preferably 40 to 70% by mass and more preferably 35 to 65% by mass. When the content of the (meth)acrylic resin is too high, the viscosity rises and stirring force required tends to be great. When the content of the (meth)acrylic resin is too low, removal of the mixture (A) and the like in the step of removing the mixture (A) from the reaction product proceeds insufficiently, and when the resulting (meth)acrylic resin composition is subjected to formation, the resulting formed article tends to have defective appearance such as silver streak.

The (meth)acrylic resin has a weight average molecular weight (hereinafter, sometimes abbreviated as Mw) of preferably thirty-five thousand to two hundred thousand, more preferably forty thousand to one hundred and fifty thousand, and further preferably forty-five thousand to one hundred and thirty thousand. When Mw is too low, a formed article resulting from the (meth)acrylic resin composition tends to have poor impact resistance and poor toughness. When Mw is too high, the fluidity of the (meth)acrylic resin composition tends to be low and forming processability tends to be low The (meth)acrylic resin has a ratio of weight average molecular weight/number average molecular weight (hereinafter, this ratio is sometimes expressed as the molecular weight distribution) of preferably 1.5 to 2.6, more preferably 1.6 to 2.3, and particularly preferably 1.7 to 2.0. When the molecular weight distribution is low, forming processability of the (meth)acrylic resin composition tends to be poor. When the molecular weight distribution is high, a formed article resulting from the (meth)acrylic resin composition tends to have poor impact resistance and be brittle.

The weight average molecular weight and the number average molecular weight are the molecular weights in terms of standard polystyrene determined by GPC (gel permeation chromatography). The weight average molecular weight and the molecular weight distribution of the (meth)acrylic resin can be controlled by selecting, for example, the kinds and the amounts of the polymerization initiator and the chain transfer agent.

The methyl methacrylate (1'), the acrylic acid alkyl ester (2'), and the chain transfer agent (3') contained in the reaction product are recovered as the mixture (A).

Recovery of the mixture (A) can be performed by a known chemical engineering means. Preferable examples thereof include a method carried out by heat devolatization, and the like. Examples of the heat devolatization method include the equilibrium flash evaporation method, the adiabatic flash evaporation method, and the like, and the adiabatic flash evaporation method is preferable. The adiabatic flash evaporation method is carried out at a temperature of preferably 200 to 300° C. and more preferably 220 to 270° C. When the adiabatic flash evaporation method is carried out at a temperature of lower than 200° C., devolatization takes long time, and devolatization may proceed insufficiently and a formed article may have defective appearance such as silver streak. On the other hand, when the adiabatic flash evaporation method is carried out at a temperature of higher than 300° C., oxidation, burning, and the like tend to occur and discoloration of the (meth)acrylic resin composition tends to occur. The adiabatic flash evaporation method may be carried out in multiple stages.

Vapor of the mixture (A) generated by flash evaporation can be used to heat the reaction product flowing through the heat exchanger tube, followed by feeding the heated reaction product into a flash tank at low pressure to cause flash evaporation. The reaction product can be pressurized using a pump, for example.

The mixture (A) immediately after recovered by the devolatization method contains the methyl methacrylate (1'), the acrylic acid alkyl ester (2'), and the chain transfer agent (3'), as well as a dimer or a trimer. The dimer or the trimer may affect the properties of the (meth)acrylic resin and therefore is preferably removed from the mixture (A). At the time of removal of the dimer or the trimer, part of the chain transfer agent (3') and solvent may also be removed.

Removal of the dimer or the trimer can be performed by a known chemical engineering means. Preferable examples thereof include a method carried out by distillation, and the like. A distillation column used in the present invention is not particularly limited but is preferably a multi-stage distillation column having about 6 to 20 stages and a reflux ratio of about 0.4 to 2.0.

After the mixture (A) is recovered from the reaction product, the (meth)acrylic resin composition according to the present invention is obtained in the residue. The resulting (meth)acrylic resin composition can be made into a pellet form as well as into a powder and grain form by a known method, for ease of handling of it as a forming material. The amount of a polymerizable monomer remaining in the (meth)acrylic resin composition obtained in the present invention is preferably not more than 1% by mass and more preferably not more than 0.5% by mass.

To the (meth)acrylic resin composition obtained by the method of the present invention, various additives can be added where appropriate. The amounts of the additives are preferably not more than 0.5% by mass and more preferably not more than 0.2% by mass relative to the amount of the (meth)acrylic resin composition. When the amounts of the additives are too great, a formed article may have defective appearance such as silver streak.

Examples of the additives include an antioxidant, a thermal degradation inhibitor, an ultraviolet absorber, a light stabilizer, a lubricant, a mold release agent, a polymer processing aid, an antistatic agent, a flame retardant, a dye and a pigment, a light dispersing agent, an organic coloring agent, a delustering agent, an impact resistance modifier, a fluorescent substance, and the like.

The antioxidant by itself has an effect to prevent oxidative degradation of a resin caused in the presence of oxygen. Examples of the antioxidant include phosphorus antioxidants, hindered phenol antioxidants, thioether antioxidants, and the like. The antioxidant can be used alone or as a combination of two or more of these. Among these, from the viewpoint of the effect to prevent optical properties from being impaired due to discoloration, phosphorus antioxidants and hindered phenol antioxidants are preferable, and concurrent use of a phosphorus antioxidant and a hindered phenol antioxidant is more preferable.

When a phosphorus antioxidant and a hindered phenol antioxidant are concurrently used, the proportion therebetween is not particularly limited but is preferably 1/5 to 2/1 and more preferably 1/2 to 1/1 in terms of the mass ratio of the phosphorus antioxidant to the hindered phenol antioxidant.

As the phosphorus antioxidant, 2, 2-methylenebis(4, 6-di-t-butylphenyl) octyl phosphite (manufactured by Asahi Denka, trade name: ADK STAB HP-10) and tris(2,4-di-t-butylphenyl)phosphite (manufactured by Ciba Specialty Chemicals, trade name: IRGAFOS 168) are preferable, for example.

As the hindered phenol antioxidant, pentaerythrityl-tetrakis[3-(3,5-di-t-butyl-4-hydroxy phenyl) propionate] (manufactured by Ciba Specialty Chemicals, trade name: IRGANOX 1010) and octadecyl-3-(3,5-di-t-butyl-4-hydroxyphenyl)propionate (manufactured by Ciba Specialty Chemicals, trade name: IRGANOX 1076) are preferable, for example.

The thermal degradation inhibitor can trap a polymer radical that is generated at high heat in the practical absence of oxygen and therefore can prevent thermal degradation of the resin.

As the thermal degradation inhibitor, 2-t-butyl-6-(3'-t-butyl-5'-methyl-hydroxybenzyl)-4-m ethylphenyl acrylate (manufactured by Sumitomo Chemical Company, Limited, trade name: SUMILIZER GM) and 2,4-di-t-amyl-6-(3',5'-di-t-amyl-2'-hydroxy-α-methyl benzyl)phenyl acrylate (manufactured by Sumitomo Chemical Company, Limited, trade name: SUMILIZER GS) are preferable, for example.

The ultraviolet absorber is a compound capable of absorbing ultraviolet light. The ultraviolet absorber is a compound known to have a primary function of converting light energy into thermal energy.

Examples of the ultraviolet absorber include benzophenones, benzotriazoles, triazines, benzoates, salicylates, cyanoacrylates, oxalanilides, malonic acid esters, formamidines, and the like. The ultraviolet absorber can be used alone or as a combination of two or more of these.

Preferable among these are benzotriazoles, or ultraviolet absorbers having a maximum molar absorption coefficient, $\epsilon_{max}$, at a wavelength of 380 to 450 nm of not more than 1200 $dm^3 \cdot mol^{-1} cm^{-1}$.

Benzotriazoles effectively inhibit optical properties from being impaired due to, for example, discoloration caused by ultraviolet exposure, and therefore are preferably used as an ultraviolet absorber when the (meth)acrylic resin composition is used in applications where such a property is required.

As the benzotriazoles, 2-(2H-benzotriazol-2-yl)-4-(1, 1, 3,3-tetramethylbutyl) phenol (manufactured by Ciba Specialty Chemicals, trade name: TINUVIN 329), and 2-(2H-benzotriazol-2-yl)-4,6-bis(2-methyl-1-phenylethyl)phenol (manufactured by Ciba Specialty Chemicals, trade name: TINUVIN 234) are preferable, for example.

The ultraviolet absorbers having a maximum molar absorption coefficient, $\epsilon_{max}$, at a wavelength of 380 to 450 nm of not more than 1200 $dm^3 \cdot mol^{-1} cm^{-1}$ can inhibit yellowing of the resulting formed article.

The maximum molar absorption coefficient, $\epsilon_{max}$, of the ultraviolet absorber is measured as follows. To 1 L of cyclohexane, 10.00 mg of the ultraviolet absorber is added and dissolved until no undissolved matter is visually observed. The resulting solution is poured into a quartz glass cell of 1 cm×1 cm×3 cm and the absorbance at a wavelength of 380 to 450 nm is measured using a U-3410 spectrophotometer manufactured by Hitachi, Ltd. Using the molecular weight (Mw) of the ultraviolet absorber and the maximum absorbance ($A_{max}$) thus measured, the maximum molar absorption coefficient, $\epsilon_{max}$, is calculated by formula:

$$\epsilon_{max} = [A_{max}/(10 \times 10^{-3})] \times Mw.$$

Examples of the ultraviolet absorbers having a maximum molar absorption coefficient, $\epsilon_{max}$, at a wavelength of 380 to 450 nm of not more than 1200 $dm^3 \cdot mol^{-1} cm^{-1}$ include 2-ethyl-2'-ethoxy-oxalanilide (manufactured by Clariant (Japan) K.K., trade name: Sanduvor VSU) and the like.

Among these ultraviolet absorbers, from the viewpoint that degradation of the resin caused by ultraviolet exposure is inhibited, benzotriazoles are preferably used.

The light stabilizer is a compound that is known to have a primary function of trapping a radical generated by light oxidation. Preferable examples of the light stabilizer include hindered amines such as compounds having a 2,2,6,6-tetraalkylpiperidine skeleton, and the like.

The mold release agent is a compound that has a function of facilitating release of a formed article from a mold. Examples of the mold release agent include higher alcohols such as cetyl alcohol, stearyl alcohol or the like; glycerol higher fatty acid esters such as stearic monoglyceride, stearic diglyceride or the like; and the like. As the mold release agent in the present invention, a higher alcohol and a glycerol fatty acid monoester are preferably used in combination. When a higher alcohol and a glycerol fatty acid monoester are used in combination, the proportion therebetween is not particularly limited but is preferably 2.5/1 to 3.5/1 and more preferably 2.8/1 to 3.2/1 in terms of the mass ratio of the higher alcohol to the glycerol fatty acid monoester.

The polymer processing aid is a compound that effectively achieves an accurate thickness and gives a thin film when forming a methacrylate resin composition. The polymer processing aid is usually a polymer particle with a particle diameter of 0.05 to 0.5 μm that can be produced by the emulsion polymerization method.

The polymer particle may be a monolayer particle composed of a polymer having a single composition ratio and a single limiting viscosity, or may be a multilayer particle composed of two or more polymers having different composition ratios or different limiting viscosities. Among these, preferable examples thereof include, for example, particles having a two-layer structure where the inner layer is a polymer layer with a low limiting viscosity and the outer layer is a polymer layer with a high limiting viscosity of not less than 5 dl/g.

The polymer processing aid preferably has a limiting viscosity of 3 to 6 dl/g.

When the limiting viscosity is too low, the effect to improve formability is low. When the limiting viscosity is too high, the melt fluidity of the (meth)acrylic resin composition tends to be low.

To the (meth)acrylic resin composition, an impact resistance modifier may be added. Examples of the impact resistance modifier include core-shell modifiers containing acrylic rubber or diene rubber as a core layer component; modifiers containing a plurality of rubber particles; and the like.

Preferable as the organic coloring agent is a compound that has a function of converting ultraviolet light, which is thought to be harmful to a resin, into visible light.

Examples of the light dispersing agent and the delustering agent include glass microparticles, polysiloxane crosslinked microparticles, crosslinked polymer microparticles, talc, calcium carbonate, barium sulfate, and the like.

Examples of the fluorescent substance include fluorescent pigments, fluorescent dyes, fluorescent white dyes, fluorescent brighteners, fluorescent bleaching agents, and the like.

These additives may be added during a phase in which the reaction starting material is present, may be added during a phase in which the reaction product is present, or may be added during a phase in which the (meth)acrylic resin composition obtained after devolatization is present.

By forming (through heating and melting) the (meth) acrylic resin composition obtained by the method of the present invention by a conventionally-known formation method such as injection molding, compression molding, extrusion, and vacuum forming, various formed articles can be obtained. Examples of the formed articles comprising the (meth)acrylic resin composition include parts of advertising signs such as advertising pillars, sign stands, projecting signs, door-top signs, and roof-top signs; display parts such as showcases, dividers, and store display parts; lighting fixture parts such as fluorescent lamp covers, mood lighting covers, lampshades, and parts of luminous ceilings, luminous walls, and chandeliers; parts of interior furnishings such as pendants and mirrors; building parts such as doors, domes, safety window panes, partitions, stair waist panels, balcony waist panels, and roofs of buildings for recreational use; transportation-related parts such as aircraft windshields, pilot visors, motorcycle windshields, motorboat windshields, visors for buses, side visors for automobiles, rear visors, head wings, and headlight covers; electronics parts such as nameplates for audiovisuals, stereo covers, television protection masks, and parts of vending machines; parts of medical equipment such as incubators and X-ray machines; parts related to instruments, such as machinery covers, gauge covers, parts of experiment instruments, rulers, dials, and view windows; optics-related parts such as protective plates for liquid crystal, light guide plates, light guide films, Fresnel lenses, lenticular lenses, and front plates and diffusing plates of various displays; traffic-related parts such as traffic signs, direction boards, traffic mirrors, and noise barrier walls; film members such as protective films for polarizers, protective films for polarizing plates, retardation films, surface materials for automotive interior, surface materials of mobile phones, and marking films; appliance parts such as lid materials and control panels of washers and top panels of rice cookers; other items such as greenhouses, large aquariums and water tanks, box-shaped aquariums and water tanks, clock panels, bathtubs, sanitary wares, desk mats, gaming parts, toys, and welding masks for facial protection; and the like.

EXAMPLES

The present invention will be described more specifically by examples and comparative examples. The present invention is, however, not limited to these examples. The present invention includes all the embodiments that combine, as needed, the above-mentioned requirements on technical characteristics such as properties, configurations, processes, and applications.

Measurement and the like of physical properties in the examples and the comparative examples are carried out by the following methods.

(Viscosity Measurement)

A liquid specimen was placed in a small pressure vessel (an autoclave), followed by raising the temperature to reach a predetermined temperature (140° C.). The stirring torque during stirring was measured, and calculation was performed on the basis of a calibration curve plotted in advance using a silicon oil having a known viscosity.

(Polymerization Conversion)

To a gas chromatograph (manufactured by Shimadzu Corporation, GC-14A), a column (GLC-G-230 manufactured by Sciences Inc., INERT CAP 1 (df=0.4 μm, I.D.=0.25 mm, length=60 m)) was attached. Analysis was performed under conditions where the injection temperature was 180° C., the detector temperature was 180° C., and the column temperature was raised from 60° C. to reach 200° C. at a temperature raising rate of 10° C./minute.

(Contents of Dimers and Trimers)

To a gas chromatograph (manufactured by Shimadzu Corporation, GC-14A), a column (GLC-G-230 manufactured by Sciences Inc., INERT CAP 1 (df=1.0 μm, I.D.=1.2 mm, length=40 m)) was attached. Analysis was performed under conditions where the injection temperature was 270° C., the detector temperature was 270° C., and the column temperature was raised from 70° C. to reach 270° C. at a temperature raising rate of 10° C./minute.

(Analysis of Composition of Mixture (A))

To a gas chromatograph (manufactured by Shimadzu Corporation, C-R8A), a column (manufactured by Shimadzu Corporation, stainless steel column (5.0 m×3.0 mm), packing material (Shimalite 60/80 NAW)) was attached. Analysis was performed at an injection temperature of 150° C., a detector temperature of 170° C., and a column temperature of 90° C.

A specimen of a mixture (A) for use in measurement: was obtained immediately before the mixture (A) joined a reaction starting material after the mixture (A) had been transported via a canned pump and had passed through a mass flowmeter.

(Loss on Heating)

A thermobalance (Shimadzu model TGA-50) was used to determine the loss on heating in a nitrogen atmosphere after the temperature was raised to 300° C. at a rate of 20° C./minute and then maintained for 60 minutes.

(Injection Moldability)

Using an injection molding machine (manufactured by Meiki Co., Ltd., M-100-DM), a (meth)acrylic resin composition in a pellet form was subjected to injection molding at a cylinder temperature of 300° C., a mold temperature of 50° C., and a molding cycle of 15 minutes to produce a plate of 200-mm long, 60-mm wide, and 0.6-mm thick. The resulting plate was observed by the naked eye for the presence or absence of blowholes (silver streak) and evaluated on the basis of the criteria below.

A; No silver streak observed
B; Silver streak observed
C; blowholes observed all over the plate (Transmittance of Formed Article)

Using an injection molding machine (manufactured by Meiki Co., Ltd., M-100-DM), a (meth)acrylic resin composition in a pellet form was subjected to injection molding at a cylinder temperature of 260° C., a mold temperature of 65° C., and a molding cycle of 2 minutes to produce a plate of 200-mm long, 60-mm wide, and 6-mm thick. The transmittance of the resulting plate in the longitudinal direction (200 mm) was measured on a PC-2200 spectrophotometer manufactured by Shimadzu Corporation. The transmittance was measured at a wavelength of 450 nm and evaluated on the basis of the criteria below.

A; Transmittance of not less than 83%
B; Transmittance of lower than 83%

(Apparatus for Polymerization)

Feeding of methyl methacrylate (MMA) and the liquid mixture (A) was performed using respective canned pumps. Downstream of these canned pumps, respective flow control valves were provided. Feeding of methyl acrylate, n-octyl mercaptan (a chain transfer agent), and a solution of 2,2'-azobis 2-methylpropionitrile (a polymerization initiator) in MMA was performed with reciprocating pumps. On the discharging side to each pump, a mass flowmeter was provided. The materials, namely, the methyl methacrylate, the liquid mixture (A), the methyl acrylate, and the n-octyl mercaptan joined upstream of a tank reactor. Downstream of where they joined, a nitrogen blender was provided for removing dissolved oxygen. The solution of 2,2'-azobis 2-methylpropionitrile in MMA was designed to join the main flow at a position downstream of the nitrogen blender and upstream of the tank reactor. The flow rate data obtained with the flowmeters was sent to an automatic controller, which transmitted command signals to the valves and the pumps to regulate the degrees of opening of the valves and the discharge pressures at the pumps so as to achieve the predetermined flow rates.

Example 1

Into a continuous-flow tank reactor (capacity: 0.1 m³, tank diameter: 500 mm, Maxblend blade, blade diameter: 260 mm, rotational speed: 200 rpm) equipped with a brine-cooling condenser, 73.6 kg of methyl methacrylate and 6.4 kg of methyl acrylate were fed, and 360 g of n-octyl mercaptan was fed thereinto, followed by performing replacement with nitrogen and then raising the temperature to reach 140° C.

When a predetermined temperature was reached, feeding was started so as to achieve a proportion of 92 parts by mass of methyl methacrylate, 8 parts by mass of methyl acrylate (MA), 0.45 part by mass of n-octyl mercaptan, and 0.0065 part by mass of 2,2'-azobis 2-methylpropionitrile (AIBN) and a mean residence time of 2.5 hours. Simultaneously, nitrogen was passed through a nitrogen blender to remove oxygen from the materials, namely, the methyl methacrylate, the methyl acrylate, and the n-octyl mercaptan.

Simultaneously with the start of feeding, a polymerization liquid was discharged from the bottom of the tank reactor so as to maintain a constant liquid level of the polymerization liquid within the tank reactor.

The liquid discharged from the reactor was fed into a heater, warmed to 230° C., and then fed at a constant flow rate into a twin screw extruder that was controlled at 250° C. The twin screw extruder separated and removed volatile matter predominantly composed of an unreacted monomer, and also extruded a strand of a resin component. The strand was cut with a pelletizer, and a (meth)acrylic resin composition was obtained as a pellet.

The monomer vapor separated using the devolatizing extruder was cooled in a heat exchanger and fed into a distillation column. The distillation column was set at a bottom temperature of 125° C. and a reflux ratio of 1. A mixture (A) was recovered from the top of the column. The high-boiling fraction at the bottom of the column was discharged continuously. The mixture (A) thus recovered was fed into the tank reactor with a canned pump. The flow rate of the mixture (A) was measured with a mass flowmeter.

Every 8 hours after the start of continuous operation, the proportions of methyl methacrylate (1'), methyl acrylate (2'), and a chain transfer agent (3') in the mixture (A) were measured by gas chromatography.

On the basis of the measurement of the amount of the mixture (A) being fed, $M_c$, the proportion of the methyl methacrylate (1') in the mixture (A), $X_{mma}$, the proportion of the methyl acrylate (2') in the mixture (A), $X_{ma}$ the proportion of the chain transfer agent (3') in the mixture (A), $X_{tran}$, the amount of a solution of a radical polymerization initiator (4) in methyl methacrylate being fed, $M_{vinit}$, and the proportion of the radical polymerization initiator (4) in the solution of the radical polymerization initiator (4) in methyl methacrylate, $X_{Tinit}$, determination of the amount of each material to be fed into the tank reactor was performed. Then, in order to obtain the amount thus determined, control system having a combination of a flowmeter, valve, and a pump was used to regulate the amount of each of methyl methacrylate (1), methyl acrylate (2), and a chain transfer agent (3) being fed. The control system used in this example was a distributed control system (DCS).

Three days after the start of operation, a liquid reaction product was taken out of the tank reactor through a sampling tube and analyzed. The liquid reaction product had a viscosity of 1.08 Pa·s, a density of 1000 kg/m$^3$, and a content of (meth)acrylic resin (polymerization conversion) of 52% by mass. The perfect-mixing time was 45 seconds, the agitation power was 2.6 kW/m$^3$, the Reynolds number was 209, the power number was 6, and the non-dimensional mixed number was 150. $P_V \times \theta \times I \times \tau_{1/2}$ yielded 0.5.

As for the (meth)acrylic resin composition obtained 3 days after the start of operation, the loss on heating and the contents of dimers and trimers were measured. The measurements are shown in Table 1.

The (meth)acrylic resin composition obtained 3 days after the start of operation and the (meth)acrylic resin composition obtained 6 days after the start of operation were dry blended at a mass ratio of 1:1, and the resulting blend was subjected to injection molding, whereby a formed article was obtained. The results of evaluation of the formed article are shown in Table 1.

Comparative Example 1

A (meth)acrylic resin composition was produced in the same manner as in Example 1 except that no control on DCS was performed and the amounts of the methyl methacrylate (1), the methyl acrylate (2), and the chain transfer agent (3) being fed were maintained constant from the start to the completion of polymerization. In the same manner as in Example 1, the (meth)acrylic resin composition was subjected to measurement of the loss on heating and the contents of dimers and trimers and also to evaluation of the formed article. The results are shown in Table 1.

Comparative Example 2

A (meth)acrylic resin composition was produced in the same manner as in Example 1 except that 0.0065 part by mass of AIBN was changed to 0.0020 part by mass of di-t-butylperoxide (PB-D) and the mean residence time within the tank reactor was changed to 4 hours.

The liquid reaction product obtained 3 days after the start of operation had a viscosity of 3.50 Pa·s, a density of 1000 kg/m$^3$, and a content of (meth)acrylic resin (polymerization conversion) of 60% by mass. The perfect-mixing time was 60 seconds, the agitation power was 2.2 kW/m$^3$, the Reynolds number was 64, the power number was 5, and the non-dimensional mixed number was 200. $P_V \times \theta \times I \times \tau_{1/2}$ yielded 1907. In the same manner as in Example 1, the (meth)acrylic resin composition was subjected to measurement of the loss on heating and the contents of dimers and trimers and also to evaluation of the formed article. The results are shown in Table 1.

TABLE 1

|  | Ex. 1 | Comp. Ex. 1 | Comp. Ex. 2 |
|---|---|---|---|
| Tank reactor |  |  |  |
| Blade shape | Maxblend blade | Maxblend blade | Maxblend blade |
| Capacity V [m$^3$] | 0.1 | 0.1 | 0.1 |
| Tank diameter D [mm] | 500 | 500 | 500 |
| Blade diameter Dp [mm] | 260 | 260 | 260 |

TABLE 1-continued

|  | Ex. 1 | Comp. Ex. 1 | Comp. Ex. 2 |
|---|---|---|---|
| Polymerization conditions |  |  |  |
| DCS | Used | Not used | Used |
| Polymerization temperature T [° C.] | 140 | 140 | 140 |
| Kind of initiator | AIBN | AIBN | PB-D |
| Half life $\tau_{1/2}$ [sec] | 4 | 4 | 3900 |
| Mean residence time θ [hr] | 2.5 | 2.5 | 4.0 |
| Amount of initiator I [ppm] | 65 | 65 | 20 |
| Rotational speed n [rpm] | 200 | 200 | 200 |
| Operation results |  |  |  |
| Polymerization conversion X [wt %] | 52 | 52 | 60 |
| Liquid viscosity μ [Pa · s] | 1.08 | 1.08 | 3.50 |
| Liquid density ρ [kg/m$^3$] | 1000 | 1000 | 1000 |
| Reynolds number Re [—] | 209 | 209 | 64 |
| Non-dimensional mixed number n · θ$_M$ | 150 | 150 | 200 |
| Perfect-mixing time θ$_M$ [sec] | 45 | 45 | 60 |
| Power number Np [—] | 6 | 6 | 5 |
| Agitation power Pv [kW/m3] | 2.6 | 2.6 | 2.2 |
| Pv × θ × I × τ1/2 [kW/m$^3$ · ppm · hr$^2$] | 0.5 | 0.5 | 190.7 |
| Formed article |  |  |  |
| Transmittance at 450 nm (optical path length 200 mm) | A | B | A |
| Amounts of dimers and trimers [% by mass] | 0.07 | 0.07 | 0.20 |
| Thermal stability (loss on heating on TGA) [%] | 20 | 20 | 40 |
| Appearance of injection-molded article (presence or absence of silver streak) | A | A | B |

As shown in Table 1, by continuously feeding virgin materials into a tank reactor with the amounts of the virgin materials being controlled on the basis of the constituent proportion of a liquid mixture (A) and the amount of the liquid mixture (A) being fed, and performing bulk polymerization under conditions that satisfy $\theta_M > \tau_{1/2}$ and $P_V \times \theta \times I \times \tau_{1/2} < 4$, according to the present invention, a (meth)acrylic resin composition having low contents of dimers and trimers, a low level of loss on heating, and few silver streaks on an injection-molded-plate, namely, having excellent thermal stability can be produced.

In contrast to this, when bulk polymerization is carried out with virgin materials being continuously fed into a tank reactor in constant amounts from the start to the completion of polymerization, a (meth)acrylic resin composition having a low light transmittance is obtained. When bulk polymerization is carried out under conditions that fail to satisfy $\theta_M > \tau_{1/2}$ or $P_V \times \theta \times I \times T_{1/2} < 4$, a (meth)acrylic resin composition containing dimers and trimers in high proportions and having a high loss on heating, namely, having poor thermal stability is obtained.

The invention claimed is:

1. A method for producing a (meth)acrylic resin composition, the method comprising:
   continuously feeding methyl methacrylate (1), a chain transfer agent (3), and a radical polymerization initiator (4) into a tank reactor while controlling each amount of the methyl methacrylate (1), the chain transfer agent (3), and the radical polymerization initiator (4),
   performing bulk polymerization in the tank reactor at a polymerization conversion of 40 to 70% by mass to obtain a reaction product,
   recovering a mixture (A) comprising methyl methacrylate (1') and a chain transfer agent (3') from the reaction product, and continuously feeding the mixture (A) into the tank reactor, wherein each of the amounts of the methyl methacrylate (1) and the chain transfer agent (3) being fed into the tank reactor is controlled on the basis of information comprising an amount of the mixture (A) being fed into the tank reactor and proportions of the methyl methacrylate (1') and the chain transfer agent (3') in the mixture (A), and a perfect-mixing time of the tank reactor ($\theta_M$ [hr]), a half life of the radical polymerization initiator at a temperature equal to a temperature inside the tank reactor ($\tau_{1/2}$ [hr]), an agitation power of the tank reactor ($P_V$ [kW/m$^3$]), a mean residence time of a reaction starting material in the tank reactor ($\theta$ [hr]), and a concentration of the radical polymerization initiator in the reaction starting material (I [ppm]) satisfy:

$\theta_M > \tau_{1/2}$, and $P_V \times \theta \times I \times \tau_{1/2} < 4.$ 2. The method for producing a (meth)acrylic resin composition according to claim 1, wherein each of the amounts of the mixture (A), the methyl methacrylate (1), the chain transfer agent (3), and the radical polymerization initiator (4) being fed into the tank reactor is measured with a mass flowmeter, and each of the amounts of the chain transfer agent (3) and the radical polymerization initiator (4) being fed into the tank reactor is controlled with a reciprocating pump.

3. The method for producing a (meth)acrylic resin composition according to claim 1, further comprising:

continuously feeding an acrylic acid alkyl ester (2) into the tank reactor while controlling an amount of the acrylic acid alkyl ester (2), wherein the mixture (A) recovered from the reaction product further comprises an acrylic acid ester (2'), and the amount of the acrylic acid alkyl ester (2) being fed is controlled on the basis of information comprising the amount of the mixture (A) being fed into the tank reactor and a proportion of the acrylic acid ester (2') in the mixture (A).

4. The method for producing a (meth)acrylic resin composition according to claim 3, wherein each of the amounts of the mixture (A), the methyl methacrylate (1), the acrylic acid alkyl ester (2), the chain transfer agent (3), and the radical polymerization initiator (4) being fed into the tank reactor is measured with a mass flowmeter, and each of the amounts of the acrylic acid alkyl ester (2), the chain transfer agent (3), and the radical polymerization initiator (4) being fed into the tank reactor is controlled with a reciprocating pump.

5. The method for producing a (meth)acrylic resin composition according to claim 1, wherein a temperature inside the tank reactor is 110 to 160° C., and the half life of the radical polymerization initiator (4) at the temperature inside the tank reactor is 0.5 to 120 seconds.

6. The method for producing a (meth)acrylic resin composition according to claim 2, wherein a temperature inside the tank reactor is 110 to 160° C., and the half life of the radical polymerization initiator (4) at the temperature inside the tank reactor is 0.5 to 120 seconds.

7. The method for producing a (meth)acrylic resin composition according to claim 3, wherein a temperature inside the tank reactor is 110 to 160° C., and the half life of the radical polymerization initiator (4) at the temperature inside the tank reactor is 0.5 to 120 seconds.

8. The method for producing a (meth)acrylic resin composition according to claim 4, wherein a temperature inside the tank reactor is 110 to 160° C., and the half life of the radical polymerization initiator (4) at the temperature inside the tank reactor is 0.5 to 120 seconds.

* * * * *